Patented May 23, 1939

2,159,843

UNITED STATES PATENT OFFICE 2,159,843

PROCESS OF MAKING SODIUM ALUMINATE

Richard Lloyd Davies, Philadelphia, Pa., assignor to Pennsylvania Salt Manufacturing Company, Philadelphia, Pa., a corporation of Pennsylvania No Drawing. Application August 18, 1937, Serial No. 159,795

11 Claims. (Cl. 23—52)

The present invention relates to an improved method for the preparation of a sodium aluminate product, and more particularly it relates to an economical process for the preparation of such products in a desired form.

One object of the present invention is to provide a process of making sodium aluminate products which is easily carried out and does not involve the use of high temperatures, costly digestion or evaporation steps, or expensive equipment.

A further object of the invention is to furnish a method of preparing sodium aluminate products in a desirable physical condition by the use of molten caustic soda of about 95% to 100% NaOH, and of alumina hydrate, which process eliminates the application of heat during the reaction due to the sensible heat of the caustic soda employed and the heat of reaction, and simplifies the production of a technically anhydrous sodium aluminate product.

Other objects, including the provision of a method for the production of completely water-soluble sodium aluminate products in granular form from a cheap source of caustic soda, will be apparent from a consideration of the specification and claims.

The processes generally used in the preparation of sodium aluminate are cumbersome, and time-consuming, and involve costly manipulative operations. In the Bayer process, bauxite is digested with a solution of caustic soda, thus producing a solution of sodium aluminate which is difficultly separated from insoluble matter. The solution is concentrated, and the sodium aluminate is recovered therefrom by crystallization, filtration, etc. Another method involves the heating of bauxite or other aluminous material at a bright red heat with various materials, for example, sodium sulphate and carbonaceous material, or sodium carbonate. The product thus produced contains insoluble material from 5% to 10%, and the process involves expensive equipment, and high temperatures accompanied by high repair and fuel charges.

An improved process of making sodium aluminate in granular form is disclosed in Letters Patent No. 2,018,607 issued October 22, 1935, wherein solid caustic soda is reacted with powdered alumina hydrate directly without aqueous dissolution or fusion of the caustic soda. In that process, heat is supplied during the reaction, and the granular product, resulting from the continuous mixing of the reacting mass is subjected to a subsequent heating step to prepare a substantially anhydrous product. Since the heat during the initial reaction is relatively low, little, if any, water formed by the reaction is removed during that step, and the subsequent heating step must, therefore, be relied upon to remove the water associated with the product.

The process of the present invention departs markedly from the known processes. Aqueous digestion is not employed, and while the reaction is between caustic soda and subdivided alumina hydrate, a relatively cheap form of caustic soda is utilized. The caustic soda employed contains sufficient sensible heat when brought in contact with the alumina hydrate to cause the reaction to become complete without the application of additional heat, thus a material saving is provided. Furthermore, the caustic soda possesses sufficient sensible heat to remove at least a portion of the water from the initial reaction product to form a plastic mass which is solidified. The removal of a portion of the water also simplifies or eliminates the subsequent dehydration step.

The term "sodium aluminate product" includes products where the molecular ratio of $Na_2O$ to $Al_2O_3$ is at least equal to 1 to 1. Thus, the product obtained as the result of the reaction of 1 mol of $Na_2O$ and 1 mol of $Al_2O_3$ is known as sodium meta-aluminate, and the one obtained by reacting 3 mols of $Na_2O$ and 1 mol of $Al_2O_3$ has the oxides present in the molecular ratio corresponding to sodium ortho-aluminate. The reaction for the formation of sodium meta-aluminate may be represented by equation (a) and of sodium ortho-aluminate by equation (b):

(a) 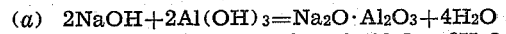
(b) 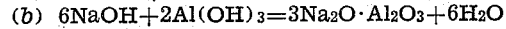

If products are prepared using between 1 mol of $Na_2O$ and 3 mols of $Na_2O$ to 1 mol of $Al_2O_3$, intermediate products are obtained. Products containing a greater molecular ratio of $Na_2O$ to $Al_2O_3$ than 3 to 1 are thought to be mixtures of an aluminate and caustic soda, and products of this type are of particular value in the detergent field. The molecular ratio of $Na_2O$ to $Al_2O_3$ in the "sodium aluminate product" may, therefore, greatly exceed 3 $Na_2O$ to 1, and the product may, for example, contain molecular ratios of $Na_2O$ to $Al_2O_3$ of 5 to 1; 10 to 1; 15 to 1; 20 to 1; and the like. As will hereinafter appear, when a completely soluble sodium aluminate product is desired, the molecular ratio of $Na_2O$ to $Al_2O_3$ should not be less than 1.2 $Na_2O$ to 1 $Al_2O_3$.

The term "alumina hydrate" as employed herein includes both the naturally occurring (bauxite)

and the artificially prepared alumina hydrates, and this reactant is used in subdivided form. Prepared aluminum trihydrate (Al(OH)₃) as available on the market, such as the so-called Bayer alumina hydrate, or this product calcined at relatively low temperatures to produce a partially hydrated product are applicable for use. The advantage of the use of calcined alumina hydrate resides in the fact that the water-content of this reactant may thus be lowered. In fact, when alumina hydrate calcined at a temperature in the neighborhood of 600° C. is reacted with molten 100% caustic soda at temperatures above its melting point, for example, about 350° C. to 370° C. or higher in a molecular ratio of Na₂O to Al₂O₃ of 1.4 to 1 or higher, a technically anhydrous product is produced directly in the reaction vessel. In addition, more easily granulated products are obtained when the molecular ratio of Na₂O to Al₂O₃ is higher than 1 to 1, 1.2 to 1 and the like, for example, when the ratio of Na₂O to Al₂O₃ is 2 or 3 to 1, than is the case when aluminum trihydrate is reacted, although no difficulty with granulation is encountered when a large excess of caustic alkali above the ratio of the orthoaluminate is employed with aluminum trihydrate. There is a tendency for the alumina hydrate to become unreactive, and to present difficulties due to dusting losses during the reaction, if the calcination is conducted at high temperatures to remove a major portion of the water therefrom. For this reason, it is advantageous to carry out the calcination, if a calcined product is to be employed, at temperatures not in excess of about 600° C., and preferably at temperatures of 300° C. to 400° C. If the alumina hydrate is heated at 300° C., the water-content is reduced from 34% to 25.4%, and a further decrease in water-content results if the calcination temperature is higher.

Bauxite ores containing approximately 30% of combined water can also be used. For example, Arkansas, Georgia-Tennessee-Alabama, and South American (Dutch and British Guiana) bauxites may be utilized as the material to be reacted with the caustic soda. If a product of a high degree of purity is desired, aluminum trihydrate, or the calcined trihydrate is employed as the source of the aluminate radical. If, on the other hand a cheaper grade of product is desired, containing some insoluble material, a powdered bauxite containing approximately 30% combined water may be used, as the percentage of sodium aluminate in the final product will depend at least in part upon the purity of the bauxite. Preferably, a bauxite is chosen which contains only a small percentage of silica, for example, not more than 6%, and, for this reason, the South American white bauxites are particularly applicable.

The molten caustic soda used in the reaction will contain about 95% to 100% NaOH. Obviously, to fulfill the requirement that molten caustic soda be employed, the caustic soda will be above its melting point, and, therefore possesses sufficient sensible heat to bring about the complete reaction, without the aid of further heat, other than that generated exothermically by the reaction. The sensible heat of the molten caustic soda and the heat generated, generally will carry the reaction to completion in 2 to 5 minutes. In the event that a technically anhydrous, granular, product is to be prepared, the sensible heat of the liquid caustic soda is preferably sufficient to remove a substantial portion of the water associated with the product. For this reason, if caustic soda containing between 95% and 100% NaOH is selected, the use of the product at its boiling point is recommended. As before stated, when 100% NaOH is used, the temperature is necessarily above its melting point (318° C.), and may advantageously be much higher, for example 400° C. to 600° C. The initial product containing the smallest amount of water will be obtained when 100% NaOH at a relatively high temperature is reacted with alumina hydrate calcined at a relatively low temperature. One of the economies of the process of the present invention resides in the fact that the molten caustic soda can be obtained directly from the concentrating equipment, for example, the caustic pots, and used in the process while it still contains the sensible heat imparted to it in its manufacture. Thus, molten caustic soda containing about 95% NaOH at its boiling point, or 100% NaOH at its finishing temperature, can be flowed directly to the reaction vessel where the process of the present invention is to be conducted.

The reactants are stirred during the reaction to insure contact between the molten caustic soda and the alumina hydrate, and the reaction is advantageously carried out, either as a continuous or an intermittent operation, in a simple device provided with a mixing arm or the like to provide the necessary stirring of the mass. The mixing may be continued until the plastic mass, first obtained is converted into a granular product in the mixer, or the reaction mass may be flowed or otherwise removed from the mixer in a plastic state, and thereafter converted into a solid state.

The products initially obtained, if hydrated as is usually the case, are of use in the trade without further treatment. If desired, a technically anhydrous product may be produced by subsequently heating the hydrated product. The dehydration is accomplished by placing the material in a drier which may take the form of a rotary kiln through which sufficient hot air passes to dehydrate the material to form the anhydrous or substantially anhydrous sodium aluminate product. Complete dehydration at 125° C. is relatively slow, but if a temperature of 250° C. or more is employed, the water is removed to form a technically anhydrous product in a comparatively short time. So rapid is this removal, that temperatures in excess of 250° C. have not been found necessary, although higher temperatures may be used; for example, 500° C. or in fact any temperature up to the melting point of the material heated. If the initial product in granular form is subjected to the secondary dehydration step, the technically anhydrous product is in the form of a granular, free-flowing product when removed from the drier. If an especially pure product is desired, the air used in the dehydrating step may be freed from its carbon dioxide.

The temperature of the particular molten caustic soda to be employed, as well as the type of alumina hydrate to be reacted therewith will depend on the properties desired in the sodium aluminate product obtained as the result of the reaction. If the presence of a small amount of insoluble material in the product is not objectionable, the choice of materials to be reacted is of no particular moment. When, however, a totally water-soluble product is desired, more care in the selection of the reactants is required. Some difficulty is encountered in producing a granular material from bauxite and liquid caustic soda of a concentration less than 100%, particularly where the ratio of $Na_2O$ to $Al_2O_3$ is low, and, therefore, when bauxite is a reactant the use of molten caustic of 100% concentration is recommended. Also, as previously stated, the use of molten 100% caustic and partially calcined alumina is advantageous in the production of granular products where the ratio of $Na_2O$ to $Al_2O_3$ is above 1.2 to 1, for example, 2 or 3 $Na_2O$ to 1 $Al_2O_3$.

It has been found that when a totally water-soluble product with as small a molecular ratio of $Na_2O$ to $Al_2O_3$ as is feasible is the object of the process, a slight excess of caustic soda over the minimum theoretical ratio of 1 mol of $Na_2O$ to 1 mol of $Al_2O_3$ should be used, for example, 1.20 mols of $Na_2O$ to 1 mol of $Al_2O_3$ is the usual minimum with a suitable adjustment of the reactants, if the temperature of the caustic soda is sufficiently high to cause loss of alumina hydrate due to the dusting resulting from the violence of the reaction.

In typical examples, using a ratio of 1.2 mols of $Na_2O$ to 1 $Al_2O_3$, the latter being furnished by sub-divided aluminum trihydrate, the following results were obtained using molten caustic soda of concentrations of 100% and at temperatures from 318° C. to 600° C., the product being stirred in each instance until the reaction mass was granulated:

higher ratio are desired, the percentage of $Na_2O$ is proportionately increased and the reaction carried out in the manner described. Thus, aluminum hydrate in amounts varying from 10 grams to 30 grams were added to 83.5 grams of molten caustic soda (100%) at 400° C. The reacting mass was stirred and as the product cooled, the mass granulated. In each case, homogeneous and satisfactory products were produced with a content of $Al_2O_3$ varying from 7% to 17%. The presence of the sodium aluminate in the caustic soda exerts a buffering action on the caustic soda, aiding it in its detergent properties.

All of the products, produced in accordance with the preceding examples, are hydrated, sodium aluminate products of use in the trade. If technically anhydrous, granular products are desired from hydrated initial products, they are obtained by heating the initial products at suitable temperatures below their melting points to remove the water therefrom; for example, a temperature of 250° C. to 500° C. may be employed.

In the production of a technically anhydrous sodium aluminate product directly in the mixing device, 24.6 pounds of molten caustic soda (100%) at 350° C. to 370° C. and 15.7 pounds of alumina trihydrate which had been heated at 600° C. (10.7 pounds of the calcined product) were added to the mixer. The reaction was very

Table

| Molecular ratio $Na_2O/Al_2O_3$ | Weight caustic used | Strength caustic | Caustic temperature | Weight alumina hydrate | Time required | Insoluble | $Na_2O$ | $Al_2O_3$ |
|---|---|---|---|---|---|---|---|---|
| | Grams | Percent | °C. | Grams | Minutes | Percent | Percent | Percent |
| 1.20 | 100 | 100 | 318 | 157 | 7 | None | 32.18 | 43.04 |
| 1.28 | 100 | 100 | 400 | 157 | 5 | None | 35.15 | 45.03 |
| 1.35 | 100 | 100 | 600 | 157 | 4 | None | 38.55 | 47.17 |

In the above table, the ratio of $N_2O$ to $Al_2O_3$ in the final product when molten caustic at 600° C. was used rose to 1.35 due to the loss of some alumina caused by the violence of the reaction at that temperature. In all the examples, the molten caustic soda possessed sufficient sensible heat to complete the reaction. It is evident from the tabulation that the amount of water removed, as indicated by the difference in the total percentages of $Na_2O$ and $Al_2O_3$, increased as the sensible heat content of the caustic soda was increased.

The use of sub-divided aluminum hydrate which has been calcined at 300° C. gave a product containing even smaller amounts of water. The calcination of the hydrate at 300° C. lowered its water-content from 34% to 25.4%, and when this calcined product was reacted with molten caustic soda (100%) at 400° C. in the manner hereinbefore described (1.2 mols of $Na_2O$ to 1 mol of $Al_2O_3$), a granular product containing sodium aluminate 86.81%, and insoluble .97% was obtained.

In the production of a product from South American bauxite, 167 parts of powdered bauxite containing about 60% of $Al_2O_3$, 6% to 8% of combined silica, titanium, and iron oxides, and 30% of combined water, were reacted with 100 parts of molten caustic soda (100%) at 400° C. The reacting mass was stirred and the reaction started in four minutes and was completed in about 10 minutes. The insoluble material in the bauxite appeared in the sodium aluminate produced, and the total insoluble amounted to 8.29%.

In the foregoing examples, a low ratio of $Na_2O$ to $Al_2O_3$ was employed, but if products having a vigorous and the stirring of the reacting mass resulted in a granulated product which was completely soluble in water.

Considerable modification is possible in the reactants selected and the proportions thereof employed, as well as in the steps of the process, without departing from the essential features of the invention.

I claim:

1. The process of preparing a solid sodium aluminate product which comprises separately supplying heat to caustic soda containing from about 95% to 100% NaOH to provide a temperature thereof above its melting point and admixing therewith a solid sub-divided alumina hydrate, the reactants being present in such molecular proportions that the $Na_2O$ content is greater than the $Al_2O_3$ content, and the temperature of the caustic soda being above its liquefying point but below 600° C. to cause a reaction between said reactants and to free the mixture of at least a portion of the water to form a plastic mass, without the application of further heat, during the reaction stirring the mixture, and converting the reaction mass into a solid state.

2. The process of preparing a solid, granular, sodium aluminate product which comprises separately supplying heat to caustic soda containing from about 95% to 100% NaOH to raise it above its melting point and admixing therewith solid sub-divided alumina hydrate, the reactants being present in such molecular proportions that the $Na_2O$ content is greater than the $Al_2O_3$ content, and the temperature of the caustic soda being above its liquefying point but below 600° C. to cause a reaction between said reactants and to free the mixture of at least sufficient water to permit granulation of the reaction product without the application of further heat, and during the reaction stirring the mixture to form a granular sodium aluminate product.

3. The process of claim 2 wherein the alumina hydrate is aluminum trihydrate.

4. The process of claim 1 wherein the alumina hydrate is aluminum trihydrate.

5. The process of claim 2 wherein the alumina hydrate is aluminum trihydrate calcined at a temperature below 600° C.

6. The process of claim 1 wherein the alumina hydrate is aluminum trihydrate calcined at a temperature below 600° C.

7. The process of claim 1 wherein the alumina hydrate is aluminum trihydrate calcined at a temperature below 600° C., and wherein the molecular ratio of the $Na_2O$ to $Al_2O_3$ in the reacting mixture is between 1.2 to 1 and 3 to 1.

8. The process of claim 1 wherein the alumina hydrate is bauxite, containing approximately 30% of combined water.

9. The process of claim 1 wherein the solid sodium aluminate product obtained is heated at a temperature below the melting point thereof to free it substantially of water and to form a substantially anhydrous sodium aluminate.

10. The process of claim 1 wherein the caustic soda is supplied directly from the concentrating equipment.

11. The process of claim 2 wherein the caustic soda is supplied directly from the concentrating equipment.

RICHARD LLOYD DAVIES.